United States Patent [19]

Turnbough

[11] 4,319,675
[45] Mar. 16, 1982

[54] ROLLER CONVEYOR

[75] Inventor: Harold L. Turnbough, St. Louis, Mo.

[73] Assignee: Alvey, Inc., St. Louis, Mo.

[21] Appl. No.: 86,834

[22] Filed: Oct. 22, 1979

[51] Int. Cl.³ .......................................... B65G 47/46
[52] U.S. Cl. .................................. 198/367; 198/436; 198/790
[58] Field of Search ............... 198/367, 370, 372, 436, 198/437, 780, 787, 789, 790; 193/35 SS, 36

[56] References Cited

U.S. PATENT DOCUMENTS

| | | | |
|---|---|---|---|
| 633,572 | 9/1899 | Cromwell | 198/790 |
| 1,860,718 | 5/1932 | Mott | 198/787 X |
| 2,319,166 | 11/1965 | Collins et al. | 198/787 X |
| 3,279,583 | 10/1966 | Abegglen | 193/36 X |
| 3,334,723 | 8/1967 | Reed et al. | 198/787 X |
| 3,484,655 | 12/1969 | Peltier | 198/367 X |
| 4,117,923 | 10/1978 | Werntz | 198/790 |

*Primary Examiner*—James L. Rowland
*Attorney, Agent, or Firm*—Gravely, Lieder & Woodruff

[57] ABSTRACT

A roller conveyor having a series of rollers forming a main path of travel for articles, a second series of rollers branching from the main series of rollers and forming a branch path of movement, mechanisms at the junction of the first and second series of rollers for selectively diverting articles to the second series of rollers in a predetermined manner, a flexible drive member having roller engaging passes for both the first and second series of rollers and idle passes out of roller engagement for simultaneously driving the first and second series of article supporting rollers, and a drive for said flexible means for effecting the simultaneous operation of the first and second series of rollers.

8 Claims, 5 Drawing Figures

ROLLER CONVEYOR

BACKGROUND OF THE INVENTION

It has been known in the conveyor art to be careful and not extend the length of conveyor sections beyond the ability of the drive means to furnish power to the article supporting rollers. There has been used in various ways V-belts, flexible ropes, and similar drive means engaged with the underside of the rollers for the purpose of moving articles supported on the top of the rollers.

It is also known in the roller conveyor art that branch roller conveyors have been associated with a main roller conveyor, but in most instances the branch roller conveyors have required individual drive means, and great care must be exercised in order to properly synchronize the conveying rollers so that articles move as desired and without bumping into lead articles.

The prior art includes a billet conveyor associated with the heat treatment of certain materials, all as described by Cromwell U.S. Pat. No. 633,572 issued Sept. 26, 1899. In this prior art there has been disclosed the use of a single or double strand heat resistant wire rope trained over a system of horizontal and vertical positioned pulleys for traversing a main line of conveyance of the material to be heat treated, as well as directing the roller drive into branches so that the billets to be conveyed can be moved out of the main line and into the branches by the use of a switching member adapted to deflect the billets from the main line into the branches.

It has been known from the disclosure in Collins et al U.S. Pat. No. 3,219,166 issued Nov. 23, 1965 that the use of tapered article supporting rollers can be employed between main and branch lines to steer articles into the branch lines by elevating the tapered rollers so as to change the direction of movement of the articles. Such an arrangement of tapered rollers is also known from the disclosure in Reed et al U.S. Pat. No. 3,334,723 issued Aug. 8, 1967. In connection with flexible drive means for roller conveyors it is known from Werntz U.S. Pat. No. 4,117,923 of Oct. 3, 1978 to provide drive means in the form of a drum and accessory elements which power the flexible drive means and maintain a desired degree of slack take up so as to maintain an efficient transfer of power into the flexible drive means.

BRIEF SUMMARY OF THE INVENTION

The present invention is related to improvements in roller conveyors and is particularly concerned with means for simultaneously operating article conveying rollers in a main line and in one or more branch lines by the use of elongated flexible drive means common to both lines of rollers.

The present invention is directed to improvements in applying the advantages of elongated flexible drive means to roller conveyors so that it will be realized that the article supporting rollers in main lines and branch lines can be driven synchronously so as to convey articles in a uniform manner.

It is an object of the present invention to provide roller conveyors with drive means for simultaneously operating a main conveying path for articles and a branch path for articles in which there is incorporated a unique system for supporting a common elongated and flexible drive means, together with means to divert articles from the main line to the branch line on command.

A preferred embodiment of the present roller conveyor is exemplified by an assembly comprising a series of rollers forming a first article conveying path of travel between inlet and outlet ends; a second series of rollers forming a second article conveying path of travel between inlet and outlet ends, said inlet end being positioned adjacent one side of said first article conveying path of travel and between its inlet an outlet ends; article diverting means operably mounted adjacent said inlet end of said second article conveying path for diverting articles into said second article conveying path from said first article conveying path; drive means for said first series of rollers having a driving pass in contact with said first series of rollers and an idle pass spaced from said first series of rollers; direction changing means operably disposed adjacent said inlet and outlet ends of said first article conveying path for changing the direction of movement of said driving means in said driving and idle passes; drive means diverting means adjacent said article diverting means for directing said drive means into and out of said second article conveying path, said drive means directed into said second article conveying path being an idle pass and said drive means directed out of said second article conveying path being a driving pass in contact with said second series of rollers; other direction changing means operably disposed adjacent said outlet end of said second article conveying path for changing the direction of movement of said diverted driving means in said idle and driving passes; and power operated means engaged with said driving means for moving it in said first and second article conveying paths.

Other objects and advantages of the present invention will be set forth in connection with the accompanying drawings, wherein:

DETAILED DESCRIPTION OF THE PREFERRED EMBODIMENTS

Figure 1:
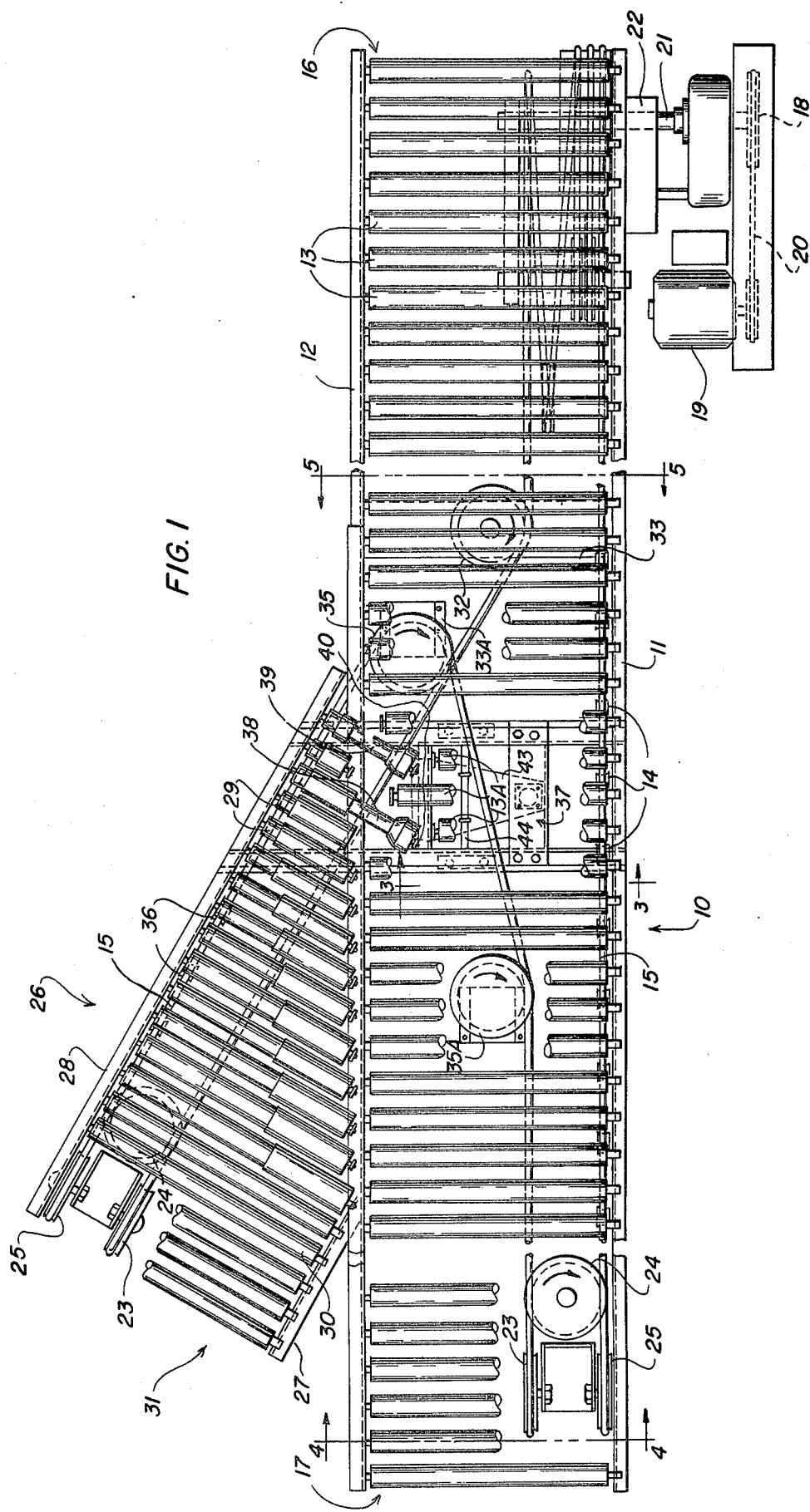
FIG. 1 is a schematic plan view of portions of the improved conveyor system showing a main roller conveyor section and a branch conveyor section in which a common drive is incorporated.

Turning now to FIG. 1 of the drawings, the embodiment illustrates a main section 10 of a roller conveyor assembly in which side rails 11 and 12 extend in spaced parallel relationship for the purpose of supporting a series of article supporting rollers 13. The side rail 11 carries a series of support rollers 14 which are arranged to cooperate with each pair of rollers 13 for the purpose of adequately supporting the elongated flexible drive means or rope 15. The flexible drive means is held up on contact to the under surface of the rollers 13 and is maintained in frictional driving engagement by the support rollers 14. Thus, the driving pass of the flexible drive means 15 moves along between the support rollers 14 and the article supporting rollers 13.

The roller conveyor assembly 10 is provided with an article receiving end 16 and a discharge end 17 which may be of any suitable length. A source of driving power is suitably assembled at station 18, and is seen to include a motor 19 suitably belt connected to a transmission 20 having an output shaft 21 operatively connected by assembly 22 to the elongated flexible drive means or rope 15. The motor-transmission-drive means may be of the type disclosed in Werntz U.S. Pat. No. 4,117,923 of Oct. 3, 1978, and the details of that prior patent are incorporated here by reference.

The main article conveying section defined between the side rails 11 and 12 extends to the discharge end 17 where there is mounted means for receiving the idler pass of the flexible drive means or rope 15 from the branch section 26 as will be pointed out presently, the rope being engaged with a suitable redirecting means. This means includes pulley 23 which is mounted on a horizontal spindle so as to direct the drive means into a second pulley 24 which rotates on a vertical spindle substantially at right angles to the axis of rotation to the pulley 23. The flexible drive means is directed by the pulley 24 onto a pulley 25 which is mounted on a spindle slightly higher than the spindle for pulley 23 so that pulley 25 rotates on a horizontal axis and directs the flexible drive means into its raised roller driving pass along the series of support rollers 14. The assembly of pulleys 23, 24 and 25 constitutes direction changing means for the flexible drive means or rope 15.

At a suitable location between the receiving end 16 and the discharge end 17 of the main roller conveyor section 10, there is located a branch section 26 defined by side rails 27 and 28 which respectively are connected to the side rail 12 in a manner well known in the roller conveyor art. In order to make the proper connection with the branch 26 the side rail 12 in the portion extending between the branch side rails 27 and 28 is modified so as to be capable of supporting the adjacent ends of rollers 13 in the main section and the series of progressively shortened rollers 29 at the inlet to the branch 26. The shorter rollers are collectively indicated at 29, while the uniformly long rollers are indicated at 30, and the rollers 30 will continue to the outlet end 31 of the branch line 26.

Figure 5:
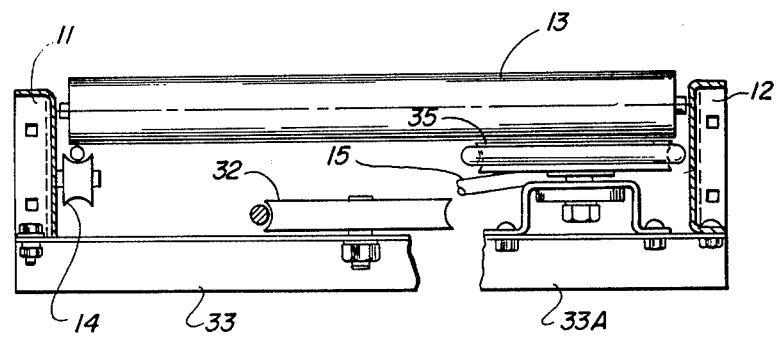
FIG. 5 is a fragmentary sectional elevational view taken along the line 5—5 in FIG. 1 showing means for directing the flexible drive means into and out of the area adjacent the meeting of the branch section and the main section of article conveying rollers.

It will be observed that the flexible drive means 15 has its idle pass directed beneath the article supporting rollers 13 so that it engages a fixed position pulley 32 suitably supported from below the side rails 11 and 12 by member 33. The pulley 32 directs the idle pass of the drive means 15 into the branch 26 so as to line up properly with redirecting means of the type employed at the discharge end 17 of the conveyor section 10. The prior description will apply here as well. Pulleys 23, 24 and 25 change the direction of travel of the flexible drive means 15 and return it along a drive pass (FIG. 1) adjacent the side rail 28 to the point where it engages pulley 35 seen in FIGS. 1 and 5. Pulley 35 is suitably supported on means 33A attached to the side rails 11 and 12. The travel of the flexible drive means 15 between the pulley 25 of the redirecting means adjacent the outlet end 31 of branch 26 and the pulley 35 is supported on a series of rollers 36 so that the drive means will frictionally engage the under surface of the rollers 30 as well as the series of shorter rollers collectively indicated at 29. Also the drive means 15 as it returns along the branch conveyor 26 is arranged to drive an article diverting means to be described. The flexible drive means 15 upon leaving the pulley 35 extends below the rollers 13 and engages the pulley 35A (hidden in FIG. 5 behind the pulley 32) before reaching pulley 23 in the redirecting means adjacent the discharge end 17 of the main roller conveyor section 10.

Figure 3:
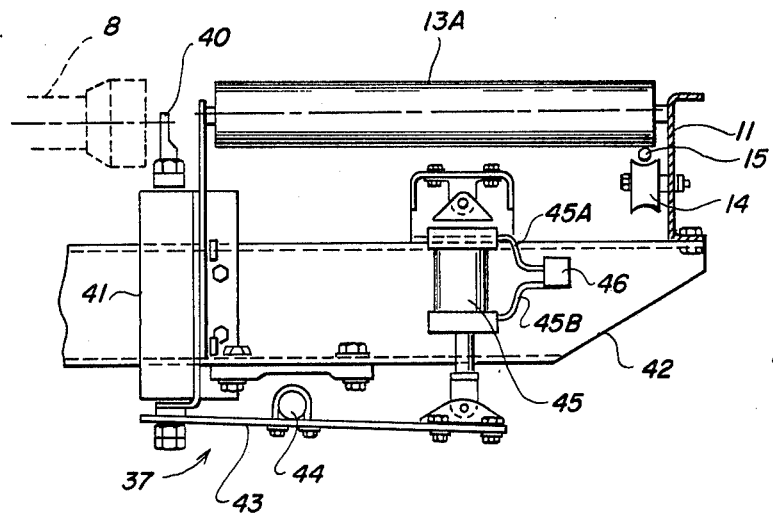
FIG. 3 is an enlarged and fragmentary sectional view of the diverter mechanism located in the junction of a conveyor branch section with the conveyor main section, the view being taken at line 3—3 in FIG. 1.
Figure 4:
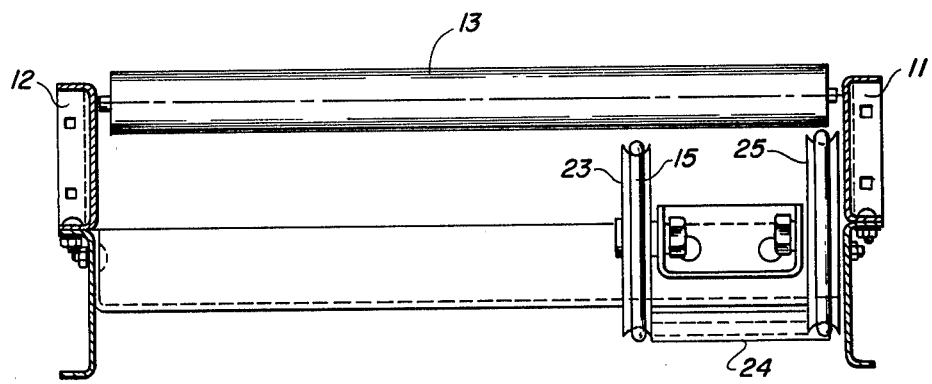
FIG. 4 is a fragmentary elevational view, partly in section, of means to establish return of the drive means, the view being taken along line 4—4 in FIG. 1.

There is indicated in FIG. 1, and shown in great detail in FIG. 3, article diverting means 37. The diverting means includes a pair of rollers 38 and 39 having the outer ends supported in the side rail 28 of the branch line 26, while the inner ends are suitably supported in spade-type bolts or similar means 40. These rollers 38 and 39 are driven by the means 15 to divert articles when called for. Each support 40 is guided in a vertical direction by stationary guides 41. The guides 41 extend below channel 42 so the lower ends can be connected to a common rock plate 43 supported on shaft 44 so that movement of the plate 43 will effect simultaneous vertical displacement of the bolts 40 for the purpose of lifting the supported ends of the rollers 38 and 39. When the rollers 38 and 39 project above the article supporting rollers 13 and specifically the adjacent rollers 13A supported in the main conveyor section of the assembly 10, articles propelled toward the discharge end 17 will be frictionally engaged on the under surface by these upwardly tilted and driven rollers and thereby steered or diverted into the branch conveyor line 26. The large diameter surfaces of rollers 38 and 39 can be treated to increase friction contact with articles. Also it has been indicated by the large diameter portions of rollers 29 that they too have been treated with friction means to increase the article propelling function. When the rollers 38 and 39 are retracted or dropped below the rollers 13A articles will pass straight through without being diverted. Movement of the rollers 38 and 39 is effected by motor means 45 which in this case may be an air cylinder connected to the plate 43. When the air cylinder piston is drawn up pressure rollers 38 and 39 are in their lowered position and when the air cylinder is energized to extend its piston rod those rollers are elevated for diverting articles. The motion of the plate 43 may be conveniently controlled by the photoelectronic means (not necessary to show) controlling the pressure fluid into either conduit 45A or 45B at a selector valve 46.

The valve 46 may be incorporated in a control circuit (not shown) which includes means for predetermining or selecting which articles are to be diverted and which articles are to be permitted to pass along the main conveyor section.

Figure 2:
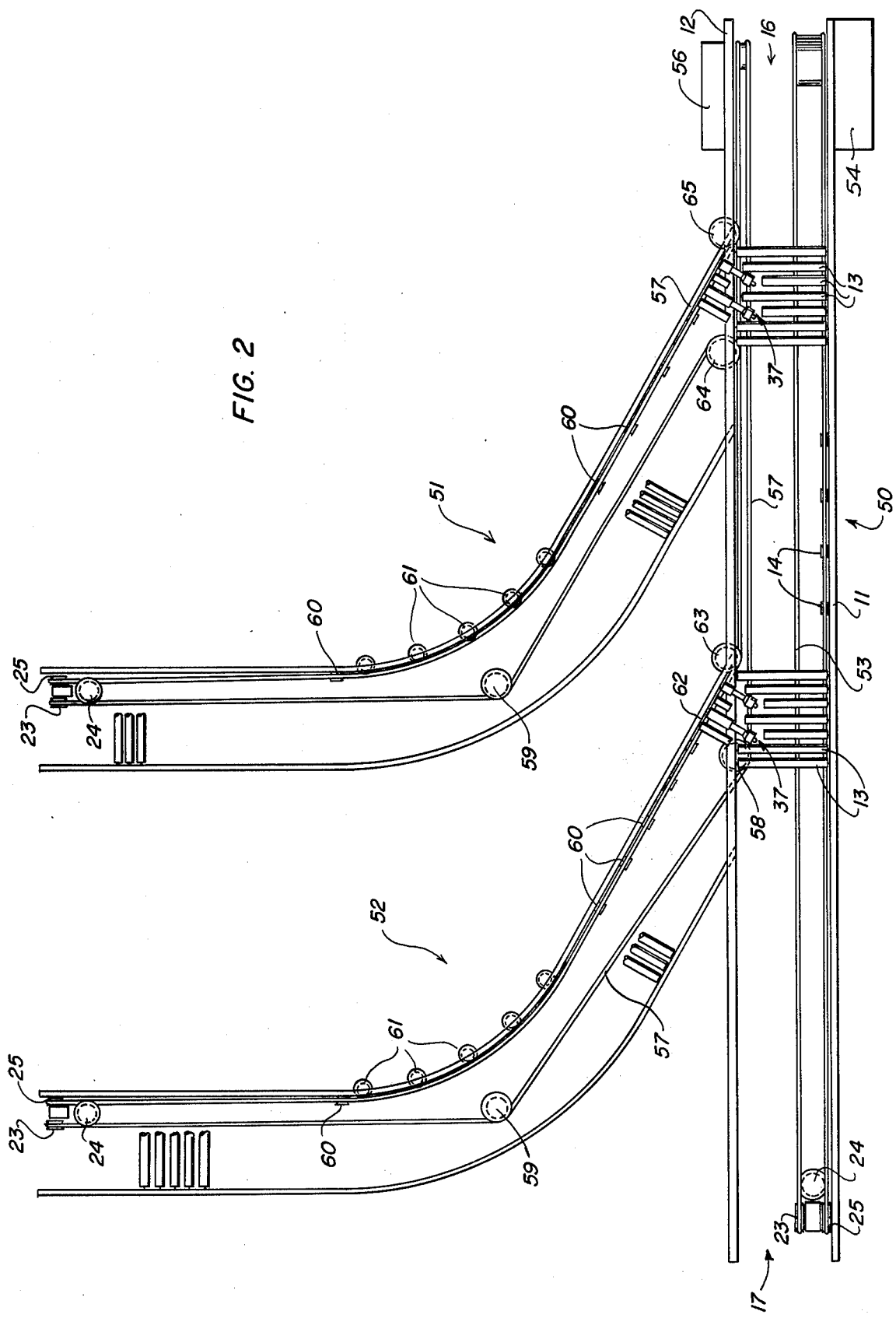
FIG. 2 is a schematic plan view of a portion of the improved conveyor system showing a modified arrangement for operating a main roller conveyor section and several branch sections.

Turning now to FIG. 2, there is shown a modified embodiment of the present invention and similar parts are to be designated by the same reference characters so as to simplify the description. The modified conveyor assembly embodies a main roller conveyor section 50 and branch conveyor lines 51 and 52. In this embodiment the driving means 54 at the inlet end 16 of the main conveyor section 50 is associated with an elongated flexible drive means or rope 53 which is applied only for driving the article supporting rollers 13 between the inlet end 16 and the discharge end 17. As before indicated the flexible drive means 53 adjacent the discharge end 17 is trained over pulleys 23, 24 and 25 so as to change direction and to establish the driving pass for the drive means 53 engaged along the under surface of the rollers 13 by support rollers 14.

A second driving means 56 is disposed adjacent the side rail 12 for the purpose of operating a second elongaged flexible drive means or rope 57 in the following manner: the elongated drive means 57 moves along an idle pass to the branch line roller conveyor 52 where it encounters a pulley 58 for changing direction to run into the branch line 52. The drive means encounters a second pulley 59 which again changes its direction for the purpose of being trained over pulleys 23, 24 and 25 in the redirecting means to direct drive means 57 into its roller driving pass supported by spaced rollers 60. Since the branch conveyor line 52 is formed with a curved section near its discharge end, a plurality of closely spaced rollers 61 are suitably suspended from the side rail 62 so as to cause the drive means 57 to transverse the curved portion on its return to a pulley 63 located at the junction between the main conveyor section and the inlet to the branch line 52.

The flexible drive means 57 extends to a further direction changing pulley 64 inside of the conveyor side rail 12, but without engaging the article supporting rollers 13. This is accomplished by positioning the pulley 64 at an elevation lower than the pulley 63. The flexible drive means 57 then is directed in the branch roller conveyor line 51 through means of a similar nature to that described for the branch line 52 and designated with the same reference numerals so as to simplify the description. The return pass of the drive means 57 is supported by a series of rollers 60 and 61 so as to properly engage the rollers in the branch conveyor section 51 for moving articles there along. The return to the drive means 56 is effected at the pulley 65 suitably supported where the branch conveyor 51 joins the main conveyor at side rail 12.

It can be seen in FIG. 2 that each of the branch conveyor lines 51 and 52 is associated with article diverting means 37 having the structure and operating characteristics described in connection with FIGS. 1 and 3. Accordingly it is not believed necessary to repeat that description as it will be understood that each of the article diverting means 37 performs in like manner to that described above, and may be controlled in like manner.

The disclosure in FIG. 2 differs from the disclosure in FIG. 1 by providing separate elongated flexible drive means for the article supporting rollers 13 in the main conveyor section 50 and the branch conveyor sections 51 and 52. When the total length of the conveyor assembly shown in FIG. 2 is within the capability of the elongated flexible drive means disclosed in FIG. 1, it should be understood that a single elongated drive means can be employed rather than to resort to two separate flexible drive means. For example, the single drive means when used in the conveyor system of FIG. 2 would be arranged to enter branch 51 in the manner shown in FIG. 1, then would be directed in like manner into branch 52 before proceeding to the discharge end 17 of the main section. The arrangement of a conveyor assembly of the type shown in either FIG. 1 or FIG. 2 should be understood to be capable of being modified in arrangement of conveyors for either right or left hand diversion of articles from a main conveyor to one or more branch conveyors.

The foregoing description has set forth certain preferred embodiments of the present invention in which a roller conveyor is arranged with a main section of conveying rollers defining an article moving surface, a branch section of conveying rollers defining another article moving surface directed at an obtuse angle from the main section as thought of in the direction of movement of articles, a group of varying length conveying rollers defining an article moving surface at the inlet of the branch section, article diverting roller means operative between the main section and the branch section such that first ends of the diverting roller means are supported in the branch section and second ends extend into the main section of conveying rollers, and power operated means connected to the second ends of the diverting roller means so that the diverting roller means may be moved between positions in the article moving surface of the main section for allowing articles to pass therealong and positions above the article moving surface of the main section of conveying rollers for diverting articles into the branch section of conveying rollers.

It is to be understood that the improvement set forth herein can be incorporated in a conveying arrangement shown in either FIG. 1 or FIG. 2, and when utilized in the arrangement of FIG. 2 the article diverting roller means would be substantially duplicated at each of the branch sections of conveying rollers.

What is claimed is:

1. A roller conveyor comprising: a first series of cylindrical article supporting rollers; side means supporting the ends of said rollers in position forming a first path along which articles may be moved; a second series of cylindrical article supporting rollers; other side means supporting the ends of said second rollers in position forming a second path along which articles may be moved, said second path diverging from and having an article receiving end adjacent said one of said first side means supporting said first rollers in said first path; article diverting means operable independently of said first and second series of rollers and being disposed adjacent said article receiving end of said second path and powered for diverting articles from said first path to said second path; flexible propelling means extending continuously through said first and second paths; and means supporting said flexible means in operative positions for travel in first directions engaged with and propelling said first and second series of rollers for advancing articles supported thereon, said first direction of travel of said propelling means being in an opposite directional sense, and for travel in second directions corresponding with the travel of the articles and out of propelling engagement with said first and second series of rollers.

2. The roller conveyor of claim 1, wherein common drive means engages said flexible propelling means for moving articles along each path.

3. The roller conveyor of claim 2, wherein power operated means is connected to said diverting means for operation thereof between article diverting and nondiverting positions, said power operated means being independent of said common drive means.

4. In a roller conveyor, the improvement which comprises: a main section of cylindrical conveying rollers defining an article moving surface; a branch section of cylindrical conveying rollers defining an article moving surface having an inlet connected into said main section at an obtuse angle as measured between said main and branch sections, said branch section of conveying rollers being made up of rollers of substantially equal length and rollers at said inlet connection of varying lengths defining an article moving surface in said branch section inlet leading into said equal length rollers; article diverting roller means interspersed with said group of conveying rollers of varying lengths, said article diverting roller means having first ends supported in said branch section and second ends interspersed with said main section conveying rollers; first power operated means engaged commonly with said conveying rollers, said group of conveying rollers, and said diverting rollers for driving the same; and second power operated means connected to said second ends of said diverting roller means to move the same between positions in the article moving surface for passing articles along said main section and positions above the article moving surface of said main section conveying rollers for diverting articles into said branch section.

5. The roller conveyor improvement set forth in claim 4, wherein said power operated means includes a rocker member having an operative connection to said second ends of said article diverting roller means, and force applying means operatively connected to said rocker member for moving the same.

6. The roller conveyor improvement set forth in claim 4, wherein said power operated means moves said driven article diverting roller means such that said second ends are higher than said first ends for elevating and steering such articles into said branch section.

7. In a roller conveyor, the improvement which comprises: first elongated side rails; a first plurality of article conveying cylindrical rollers mounted in said first side rails to define a first article moving surface; other side rails extending from one of said first elongated side rails; a second plurality of article conveying substantially cylindrical rollers mounted in said other side rails to define a second article moving surface diverging from said first article moving surface, said second plurality of article conveying substantially cylindrical rollers inluding a series of rollers of differing lengths having first ends supported by said one of said first elongated side rails and second ends supported in one of said other side rails, said series of rollers being in positions to make up an article receiving surface entering said second article moving surface; article diverting roller means included in said series of rollers in position to extend partially into said first plurality of article conveying rollers, said diverting rollers having friction surfaces selectively positionable within said first article moving surface and positionable above said latter article moving surface for engaging and diverting articles; power operated means connected to said diverting rollers for effecting the selective positioning thereof; and drive means commonly engaged with said first and second plurality of article conveying rollers and said diverting rollers, whereby all of said rollers are driven in a direction for propelling articles in the same directional sense through said first and second article moving surfaces as determined by said selectively positionable article diverting roller means.

8. The roller conveyor improvement set forth in claim 7, wherein said series of rollers of differing lengths having friction means thereon for increasing the pull of such rollers upon articles being diverted thereon by said diverting rollers.

* * * * *

UNITED STATES PATENT AND TRADEMARK OFFICE
CERTIFICATE OF CORRECTION

PATENT NO. : 4,319,675
DATED : March 16, 1982
INVENTOR(S) : Harold L. Turnbough

It is certified that error appears in the above—identified patent and that said Letters Patent are hereby corrected as shown below:

Under References Cited, the third reference which is "2,319,166  11/1965 Collins et al.........198/787 X" should be "3,219,166  11/1965 Collins et al......198/787 X".

Column 2, line 10, after "inlet" the word "an" should be "and".

Column 8, lines 6 & 7, after "rollers" the word "inluding" should be "including".

Signed and Sealed this

Eighteenth Day of May 1982

[SEAL]

Attest:

Attesting Officer

GERALD J. MOSSINGHOFF
Commissioner of Patents and Trademarks